(12) United States Patent
Sharma et al.

(10) Patent No.: US 9,348,828 B1
(45) Date of Patent: *May 24, 2016

(54) SYSTEM AND METHOD OF ENHANCED BACKUP AND RECOVERY CONFIGURATION

(71) Applicant: EMC Corporation, Hopkinton, MA (US)

(72) Inventors: Satyendra Nath Sharma, Bangalore (IN); Kamal Kishore Pandey, Bareilly (IN)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/600,917

(22) Filed: Jan. 20, 2015

Related U.S. Application Data

(63) Continuation of application No. 13/310,486, filed on Dec. 2, 2011, now Pat. No. 8,972,353.

(51) Int. Cl.
*G06F 17/30* (2006.01)
*G06F 11/14* (2006.01)

(52) U.S. Cl.
CPC ...... *G06F 17/30088* (2013.01); *G06F 11/1458* (2013.01)

(58) Field of Classification Search
USPC .................. 707/637, 639–640, 649
See application file for complete search history.

(56) References Cited

U.S. PATENT DOCUMENTS

| 8,200,638 B1 * | 6/2012 | Zheng et al. ............... 707/679 |
| 2009/0292882 A1 * | 11/2009 | Li et al. ........................ 711/141 |
| 2010/0036851 A1 * | 2/2010 | Paterson-Jones et al. ...... 707/10 |
| 2010/0036931 A1 * | 2/2010 | Certain et al. ............. 709/214 |
| 2010/0037031 A1 * | 2/2010 | DeSantis et al. ........... 711/162 |

* cited by examiner

*Primary Examiner* — Hanh Thai
(74) *Attorney, Agent, or Firm* — Staniford Tomita LLP

(57) ABSTRACT

This disclosure relates to a method, article of manufacture, and apparatus for backing up data. In some embodiments, this includes a backup server locating one or more instances of data associated with a list of identifiers, wherein each instance of data comprises one or more target volumes and associated journal volume; the enablement of replication; and replication.

19 Claims, 3 Drawing Sheets

SYSTEM AND METHOD OF ENHANCED BACKUP AND RECOVERY CONFIGURATION

CROSS-REFERENCE TO RELATED APPLICATIONS

This application is a continuation U.S. patent application Ser. No. 13/310,486 for SYSTEM AND METHOD OF ENHANCED BACKUP AND RECOVERY CONFIGURATION filed Dec. 2, 2011, which is incorporated herein by reference for all purposes.

FIELD

The present invention relates generally to data systems and specifically to systems and methods of efficient data backup and recovery.

BACKGROUND

The need for business continuance and fast data recovery is acute and well known. Businesses often use multiple replication techniques to prevent loss of data, for example in case of disaster, or to meet regulatory requirements. Various replication methods in existence today include creating copies and generating snapshots, i.e. subsequent incremental backups.

One data replication method is to make a copy of a source volume and store the copy to a target volume. When data need to be restored, data on the target volume is readily available for use. A disadvantage of this type of copy method is that data on the source and target may become out-of-sync when replication is performed infrequently, i.e. the source and target data gets differ. On the other hand, frequent data mirroring to keep data in sync may be unnecessary and consumes excessive system resources.

Another replication method is point-in-time replication such as generating snapshots. An incremental backup includes only data that have changed from a previous replication. Existing snapshot systems generally maintain three volumes: source, target and journal. The source volume stores data from hosts, and snapshots of data on the source volume are replicated to the target and journal volumes. The target volume contains one or more point-in-time images of the entire data to be replicated that is stored in the source volume, i.e. snapshots. The journal volume logs data changes made from the point in time of the snapshot image in the target volume. When data need to be restored up to a specific point in time, the incremental backups from the journal volume are used to update the snapshots from the target volume up to the specified time. The journal volume is a sequential storage system, so that once a specific point in time is indicated, every item that is stored before or after in the journal volume is used to update the snapshot from the target volume, as if the target volume snapshot is rolled backward or forward.

Restoring data from snapshot to a previous desired state will typically take longer than restoring from a full copy. The delay is due to applying successive updates, i.e. incremental backups up to a specified time on the target volume to generate a desired point-in-time image. The delay may be exacerbated when there is a steady stream of I/O to and from the source volume. The frequent I/O activities on the source volume in turn, require frequent updates to the target volume snapshots and journal volume incremental backups. Especially in large enterprise configurations, busy business activities often generate frequent I/O activities on a large number of volumes. Waiting for each target volume rolling backward or forward to desired points in time during busy I/O may cause long delays to point-in-time data recovery and in extreme cases, may interfere with business operations.

There is a need, therefore, for an improved method or system that efficiently backs up a large volume of data on a computer system subject to a steady stream of I/O.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
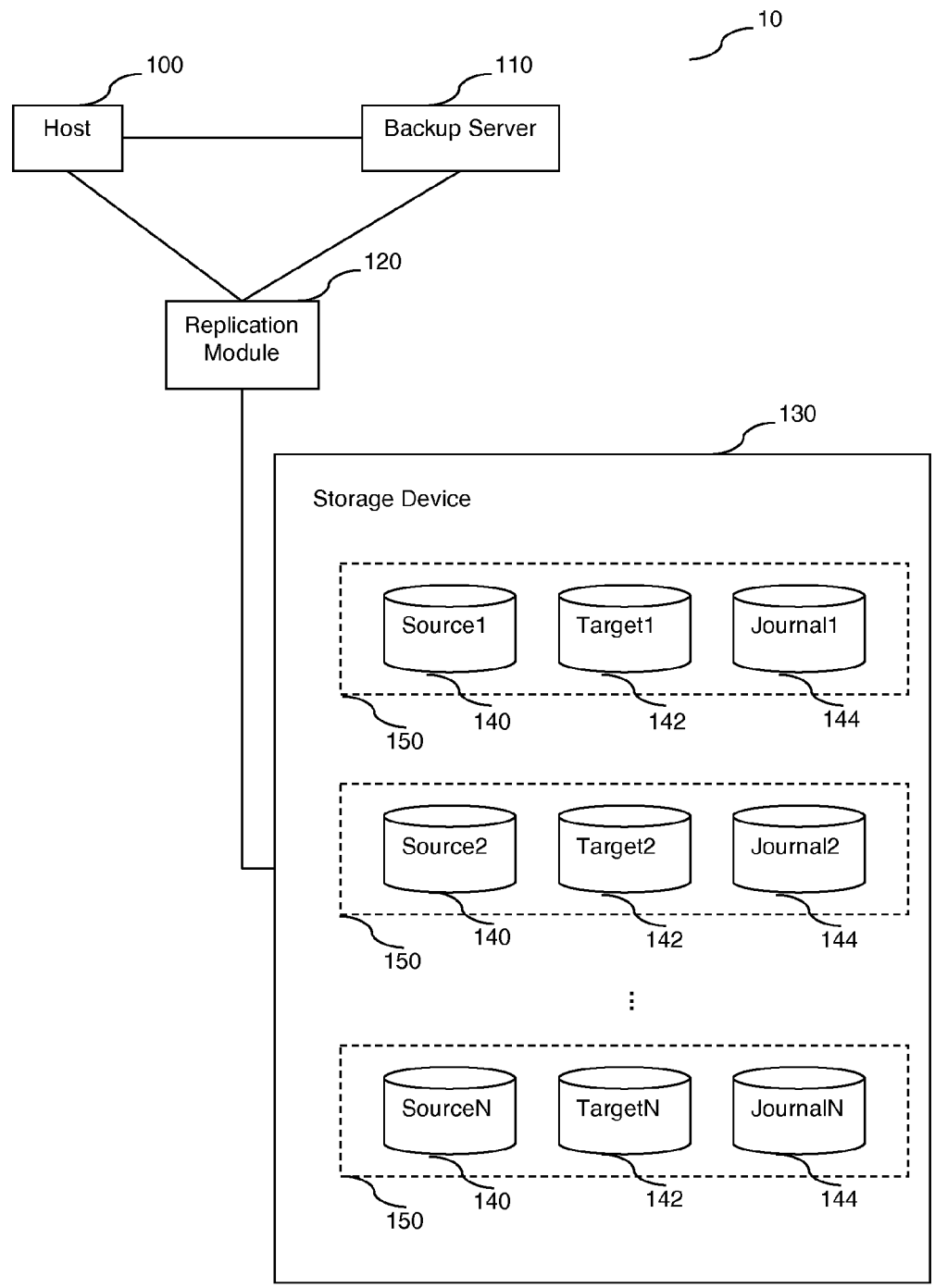
FIG. 1 is a diagram of a data storage system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules.

Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data system configured to store files, but it should be understood that the principles of the invention are not limited to data systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

FIG. 1 is a system architecture illustrating one embodiment of a data storage system. Data Storage System 10 includes Host 100, Backup Server 110, Replication Module 120, and Storage Device 130. In some embodiments, Host 100 may be in communication with Backup Server 110 using a dedicated communication link, one or more networks, a local area network, a wide area network, a storage area network, the Internet, a wired network, and/or wireless network, among others. Similarly, other communication links connecting Host 100, Backup Server 110, Replication Module 120 and Storage Device 130 may be a dedicated communication link, one or more networks, a local area network, a wide area network, a storage area network, the Internet, a wired network, and/or wireless network, among others.

In some embodiments, Replication Module 120 is capable of executing the processes and methods described herein. Though FIG. 1 illustrates Replication Module 120 to be external to Host 100 and Backup Server 130, Replication Module may reside and operate or be operated inside Host 100 and/or Backup Server 130. As used herein, "module" may refer to logic embodied in hardware or firmware, or to a collection of instructions such as software instructions, possibly having entry and exit points, written in instructions or a programming language. The modules described herein may also be represented in hardware or firmware.

In one embodiment, Host 100 may represent a production host performing or subject to Input/Output (I/O) activities and generating or receiving data for storage and backup. Data writes to Host 100 may be first sent to Replication Module 120. Replication Module 120 is responsible for replicating to Source 140 and/or Target 142 data generated by or comprising the payload of I/O activities on Host 100. Additionally, through Replication Module 120, backup data may be rolled back to a recovery point in time, which may be used in the event of data corruption of a disaster in order to view or access data at a recovery point in time. Though FIG. 1 depicts only one host, Data Storage System 10 may include multiple hosts.

Similarly, though FIG. 1 depicts only one storage device, Data Storage System 10 may include multiple storage devices. A Storage Device 130 in turn may include one or more disks, each containing a different portion of data stored on Storage Device 130. The storage space in Storage Device 130 may also be apportioned pursuant to a file system, or may be logical or virtual (i.e. not corresponding to underlying physical storage) or may be subdivided into a plurality of volumes or logical devices. The logical devices may or may not correspond to the physical storage space of the disks. Thus, for example, a physical storage device may contain a plurality of logical devices or, alternatively, a single logical device could span across multiple physical devices. Host 100 may be configured to access any combination of logical devices independent of the actual correspondence between the logical devices and the physical devices. Storage Device 130 may be provided as a stand-alone device coupled relatively directly to Host 100 or, alternatively, Storage Device 130 may be part of a storage area network (SAN) that includes a plurality of other storage devices as well as routers, network connections, etc. The system described herein may be implemented using software, hardware, and/or a combination of software and hardware where software may be stored in an appropriate storage medium and executed by one or more processors.

As illustrated by FIG. 1, there may be any number of volumes within Storage Device 130. Volumes Source1 140, Target1 142 and Journal1 144 may be grouped together as a volume set 150. A volume set may contain data from Host 100, replications of data, and logs of modifications of data. In some embodiments, after Replication Module 120 receives data writes from Host 100 due to I/O activities, Replication Module 120 may write to Source 140 as well as replicate a copy or otherwise write directly to Target 142. In addition, Replication Module 120 may track data modifications to Journal 144 as snapshots. Though FIG. 1 depicts only one target volume 142 in a volume set 150, volume set 150 may include multiple target volumes 142 so that data from one source volume 140 may be replicated to multiple target volumes.

As used herein, a "snapshot" may be of a body of data to be backed up such as a full volume, or may only be an incremental change in that body of data from an earlier snapshot, bookmark, or state. For example, a snapshot may correspond to a single write, or a number of writes, and may, but need not be, a snapshot of one or more of the following types: full volume, incremental, read-only, read/write, clone, consistency group, copy-on-write, low-capacity, or split-mirror, for example. Each snapshot may be labeled with a unique snapshot identifier. For example, in one embodiment, the snapshot identifier may be the time or a representation of the time that the snapshot was created. In another embodiment, the snapshot identifier may be some other identifier that indicates a correspondence with a related snapshot.

In one embodiment, to access or restore the data on Target 142 to some recovery point in time, Target 142 may be rolled backward or forward to enable an image of a desired recovery point in time. The enabling process may first locate successive data modifications from Journal 144 of a volume set 150 and apply located successive data modifications to Target 142 until the desired recovery point-in-time image is reached. Once the recovery point in time image is rebuilt, Target 142 is enabled (for example, for read or write access) and the image of the desired recovery point in time on Target 142 may be available for access.

The time taken to restore Target 142 to a recovery point in time may depend on the number of successive data modifications stored in Journal 144. For example, frequent I/O activities on Host 100 may produce a large number of data modifications, which may be associated with a large number of journal entries in Journal 144 occurring since a previous snapshot. Reaching a recovery point in time on Target 142 in such a configuration may take longer since there are many successive data modifications following a snapshot to be applied to the snapshot in Target 142.

Unless the copy set of Target 142 and Journal 144 are enabled, Replication Module 120 prohibits direct read and/or write to the copy set from sources other than Replication Module 120. Embodiments of the invention provide that during the enabling process, Replication Module 120 communicates enabling commands to all Targets 142 associated with the backup list. Once the enabling process starts and Targets 142 will not be accessible (for example, for read or write access directly) until all snapshots of Journals 144 called for by the snapshot identifiers of the host backup list have been applied to Target 142, or until a specified time limit or number of attempts has been reached. After the enabling process ends successfully, Target 142 with the image representing a desired recovery point in time is exposed and can be accessed by Backup Server 110.

Backup Server 110 represents a host process, file server, or similar devices configured to store data to and retrieve data from Storage Device 130 through Replication Module 120. In one embodiment, Backup Server 110 may initiate a backup process by requesting Host 100 to prepare a backup list. The backup list may contain one or more snapshot identifiers. After receiving the snapshot identifiers, Backup Server 110 may instruct Replication Module 120 to enable, i.e. permit read and/or write access with respect to all corresponding target volumes 142. Since an enabling process may take a non-trivial amount of time, Backup Server 110 may periodically poll each Target 142 associated with the backup list to determine if Target 142 is enabled. Once any Target 142 is enabled for access, Backup Server 110 may perform backup on such Target 142 without waiting for access to be enabled on each Target 142 of the current backup process.

Figure 2:
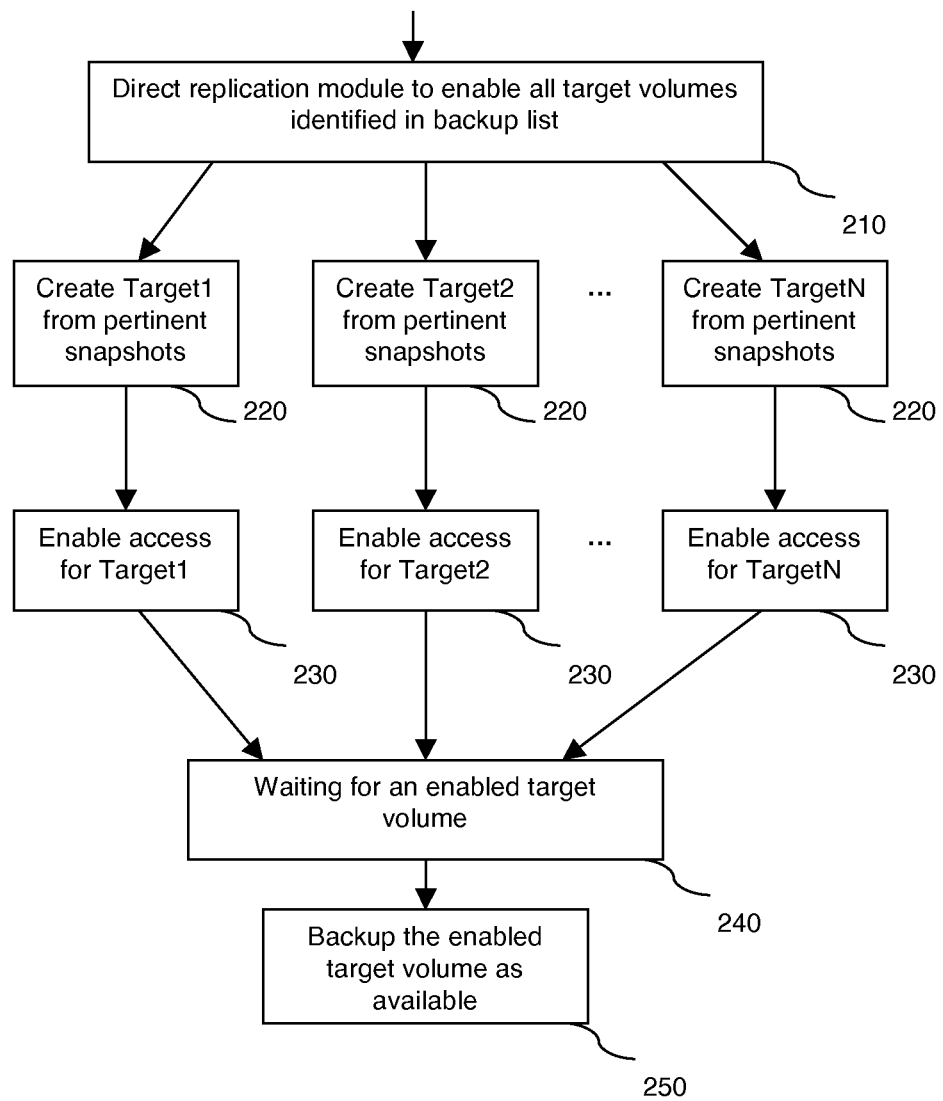
FIG. 2 is a diagram of the logical interaction within a data storage system in accordance with some embodiments.

FIG. 2 is a process flow diagram depicting one embodiment of the logical interaction between Backup Server 110 and a collection of Target 142 volumes. In step 210, Backup Server 110 may first direct Replication Module 120 to enable all Targets 142 associated with the snapshot identifiers in the backup list. In step 220, after receiving the enabling command from Replication Module 120, each Target 142 may be rolled backward or forward using pertinent snapshots to create an image representing the desired recovery point in time. Upon reaching the desired recovery point in time, Target 142 is enabled in step 230, i.e. read and/or write access is permitted. Once enabling processes on target volumes start in parallel, Backup Server 110 may enter the waiting stage 240 for an enabled Target 142. As soon as one of Target 142 volumes is enabled, Backup Server 110 may start the backup process 250 on that volume.

Performing backup on Target 142 in accord with some embodiments described herein has several benefits. Backup operation may consume system resources. If the backup operation is directly performed on Source 140, the extra system resources consumption from the backup operation may be overly burdensome to Source 140 and may cause system performance degradation. Thus, performing backup from Target 142 is less disruptive to normal business operations.

Further, the parallel process depicted in FIG. 2 improves efficiency. For example, financial institutes or health care organizations often need to maintain large volumes of data generated by and subject to frequent I/O activities. Frequent I/O activities may be recorded as large number of entries in Journals 144. To comply with regulatory requirements and/or optimal or preferable business practices, these businesses may also need to make sure large volumes of backup data are readily available for recovery. Reaching a specific recovery point in time on Target 142 may take a while due to the large number of entries in Journal 144 that must be applied to Target 142 before the desired recovery point in time is reached. The parallel process depicted in FIG. 2 takes less time to complete than a sequential process of waiting for the enablement of (i.e. access to) a first Target 142 corresponding to a first or subsequent item in the backup list, backing up this target image then moving on to the next item in the backup list. Especially in case of backing up a large volume data on a computer system with a steady stream of I/O, parallel process of an embodiment of the instant invention will be preferable to a sequential process. Thus, the backup method in accord with some embodiments described herein completes faster and/or is more efficient.

In addition to efficiency, the backup method in accord with some embodiments described herein is also flexible. The snapshot method of embodiments of the invention has the benefit of providing flexible recovery of any point in time corresponding to a snapshot. A user may configure the logging (i.e. incremental snapshot generation) in Journal 144 to any granularity ranging from per write, to per second, to any other intervals or frequency. Therefore, during the enabling process, Target 142 may be rolled backward or forward to any supported point in time or event. Once an image is enabled on Target 142, it is ready to be utilized as a full copy backup. The copy may then be used for instant restoration during recovery. Thus, an embodiment of the invention combining snapshot method with full copy method, namely enabling Target 142 and performing copying on Target 142 benefits from both the flexibility of a snapshot method but with the fast restoration of a full image copy.

Figure 3:
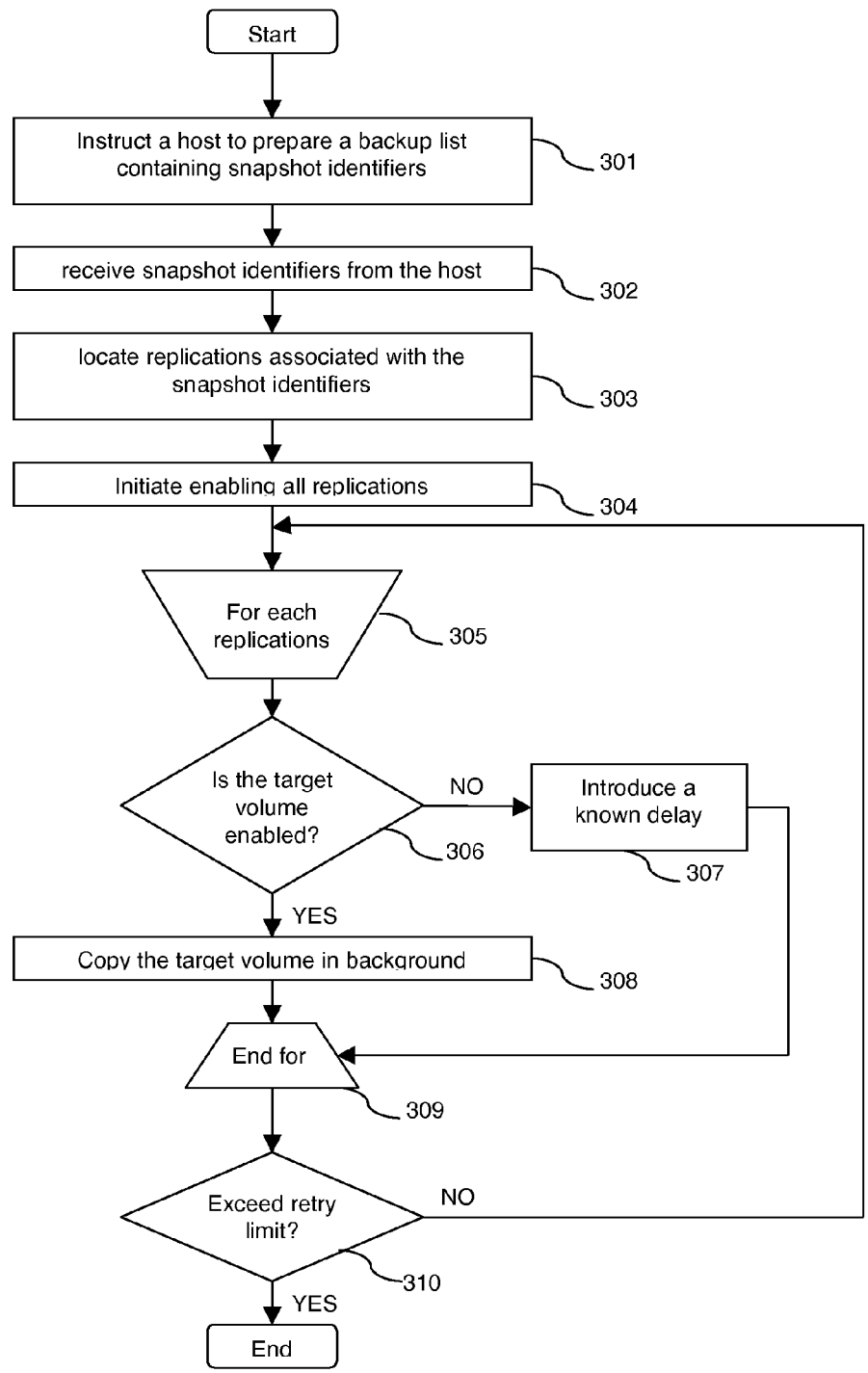
FIG. 3 is a flow chart illustrating a method to backup data in accordance with some embodiments.

FIG. 3 illustrates one embodiment of a flowchart of operations for performing a data backup. In the depicted embodiment, a data backup begins when Backup Server 110 instructs Host 100 to prepare a backup list in step 301. The backup list may contain one or more snapshot identifiers. In response to the request from Backup Server 110, Host 100 may send a backup list containing one or more snapshot identifiers to Backup Server 110. Upon receiving the snapshot identifiers in step 302, in step 303, Backup Server 110 may instruct Replication Module 120 to locate replications associated with the snapshot identifiers.

Having located all corresponding replications, in step 304, Backup Server 110 may instruct Replication Module 120 to initiate the enabling process for all replications. The enabling process may take time since it may involve first locating successive data modifications (i.e. snapshots) in Journal 144 of a volume set 150, then applying all successive data modifications to Target 142 until a desired recovery point in time of the data is reached. Once the recovery point in time is reached, Target 142 may be made enabled (i.e. the restored image may be made available for access.)

Since an enabling process associated with multiple replications may take time, Backup Server 110 may periodically poll each Target 142 associated with the backup list through a loop 305 such as a for/each loop, to determine if Target 142 is accessible for backup. Once a determination 306 of enabled status is made, if Target 142 is not enabled, Backup Server 110 may introduce a specified or other delay in step 307 before reaching the end of one round of for loop 309 and move to a next item in the backup list. On the other hand, if Target 142 is enabled, a backup operation may be performed in step 308 copying Target 142. This may be performed in the background. The steps with for loop 305 may be repeated until a retry limit has been reached. In some embodiments, the retry limit may be a large number to ensure that except in rare instances, all volumes associated with the backup list are enabled and backed up, i.e. replicated to designated backup storage somewhere in the enterprise, network, or system.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method comprising:
   instructing at least one host to prepare at least one backup list, wherein the at least one backup list comprises one or more identifiers, each of the one or more identifiers being associated with at least one copy set corresponding to a source volume;
   receiving from the host the list of one or more identifiers;
   locating a first copy set associated with a first identifier;
   locating a second copy set associated with a second identifier;
   applying first snapshots to the first copy set;
   applying, in parallel with the applying first snapshots, second snapshots to the second copy set; and
   prohibiting access to a copy set until at least one of a plurality of conditions has occurred, wherein the plurality of conditions comprise:
   a first condition occurs when all snapshots for a desired recovery point in time have been applied to the copy set; and
   a second condition occurs when a specified time limit has been reached.

2. The method of claim 1 wherein the plurality of conditions comprise a third condition occurs when a specified number of attempts has been reached to determine whether all snapshots for the desired recovery point in time have been applied to the copy set.

3. The method of claim 1 wherein the prohibiting access to a copy set comprises prohibiting access to the copy set from sources other than a replication module.

4. The method of claim 1 comprising:
   exposing one of the first or second copy sets to access because at least one of the plurality of conditions has occurred for the one of the first or second copy sets; and
   after the exposing one of the first or second copy sets to access, continuing to prohibit access to another of the first or second copy sets because at least one of the plurality of conditions has not occurred for the other of the first or second copy sets.

5. The method of claim 1 comprising:
   exposing the first copy set to access because at least one of the plurality of conditions has occurred for the first copy set; and
   while the first copy set is exposed to access, continuing to apply the second snapshots to the second copy set.

6. The method of claim 1 comprising:
   determining that the at least one of a plurality of conditions has not occurred;
   upon the determination, introducing a delay; and
   after the delay, polling at least one target volume associated with one of the first or second copy sets to determine whether all snapshots for the desired recovery point in time have been applied to the one of the first or second copy sets.

7. A system comprising a processor configured to:
   instruct at least one host to prepare at least one backup list, wherein the at least one backup list comprises one or more identifiers, each of the one or more identifiers being associated with at least one copy set corresponding to a source volume;
   receive from the host the list of one or more identifiers;
   locate a first copy set associated with a first identifier;
   locate a second copy set associated with a second identifier;
   apply first snapshots to the first copy set;
   apply, in parallel with the application of first snapshots, second snapshots to the second copy set; and
   prohibit access to a copy set until at least one of a plurality of conditions has occurred, wherein the plurality of conditions comprise:
   a first condition occurs when all snapshots for a desired recovery point in time have been applied to the copy set; and
   a second condition occurs when a specified time limit has been reached.

8. The system of claim 7 wherein the plurality of conditions comprise a third condition occurs when a specified number of attempts has been reached to determine whether all snapshots for the desired recovery point in time have been applied to the copy set.

9. The system of claim 7 wherein the processor is configured to prohibit access to the copy set from sources other than a replication module.

10. The system of claim 7 wherein the processor is configured to:
    expose one of the first or second copy sets to access because at least one of the plurality of conditions has occurred for the one of the first or second copy sets; and
    after the exposure of one of the first or second copy sets to access, continue to prohibit access to another of the first or second copy sets because at least one of the plurality of conditions has not occurred for the other of the first or second copy sets.

11. The system of claim 7 wherein the processor is configured to:
    expose the first copy set to access because at least one of the plurality of conditions has occurred for the first copy set; and while the first copy set is exposed to access, continue to apply the second snapshots to the second copy set.

12. The system of claim 7 wherein the processor is configured to:
    determine that the at least one of a plurality of conditions has not occurred;
    upon the determination, introduce a delay; and
    after the delay, poll at least one target volume associated with one of the first or second copy sets to determine whether all snapshots for the desired recovery point in time have been applied to the one of the first or second copy sets.

13. A computer program product comprising a computer usable medium having machine readable code embodied therein for:
    instructing at least one host to prepare at least one backup list, wherein the at least one backup list comprises one or more identifiers, each of the one or more identifiers being associated with at least one copy set corresponding to a source volume;
    receiving from the host the list of one or more identifiers;
    locating a first copy set associated with a first identifier;
    locating a second copy set associated with a second identifier;
    applying first snapshots to the first copy set;
    applying, in parallel with the applying first snapshots, second snapshots to the second copy set; and
    prohibiting access to a copy set until at least one of a plurality of conditions has occurred, wherein the plurality of conditions comprise:
        a first condition occurs when all snapshots for a desired recovery point in time have been applied to the copy set; and
        a second condition occurs when a specified time limit has been reached.

14. The computer program product of claim 13 wherein the plurality of conditions comprise a third condition occurs when a specified number of attempts has been reached to determine whether all snapshots for the desired recovery point in time have been applied to the copy set.

15. The computer program product of claim 13 wherein the prohibiting access to a copy set comprises prohibiting access to the copy set from sources other than a replication module.

16. The computer program product of claim 13 wherein the computer usable medium comprises machine readable code embodied therein for:
    exposing one of the first or second copy sets to access because at least one of the plurality of conditions has occurred for the one of the first or second copy sets; and
    after the exposing one of the first or second copy sets to access, continuing to prohibit access to another of the first or second copy sets because at least one of the plurality of conditions has not occurred for the other of the first or second copy sets.

17. The computer program product of claim 13 wherein the computer usable medium comprises machine readable code embodied therein for:
    exposing the first copy set to access because at least one of the plurality of conditions has occurred for the first copy set; and
    while the first copy set is exposed to access, continuing to apply the second snapshots to the second copy set.

18. The computer program product of claim 13 wherein the computer usable medium comprises machine readable code embodied therein for:
    determining that the at least one of a plurality of conditions has not occurred;
    upon the determination, introducing a delay; and
    after the delay, polling at least one target volume associated with one of the first or second copy sets to determine whether all snapshots for the desired recovery point in time have been applied to the one of the first or second copy sets.

19. The method of claim 1 wherein the prohibiting access to a copy set comprises prohibiting read access.

* * * * *